Inventor
Henry W. Kudlacik
by W. C. Crutcher
His Attorney

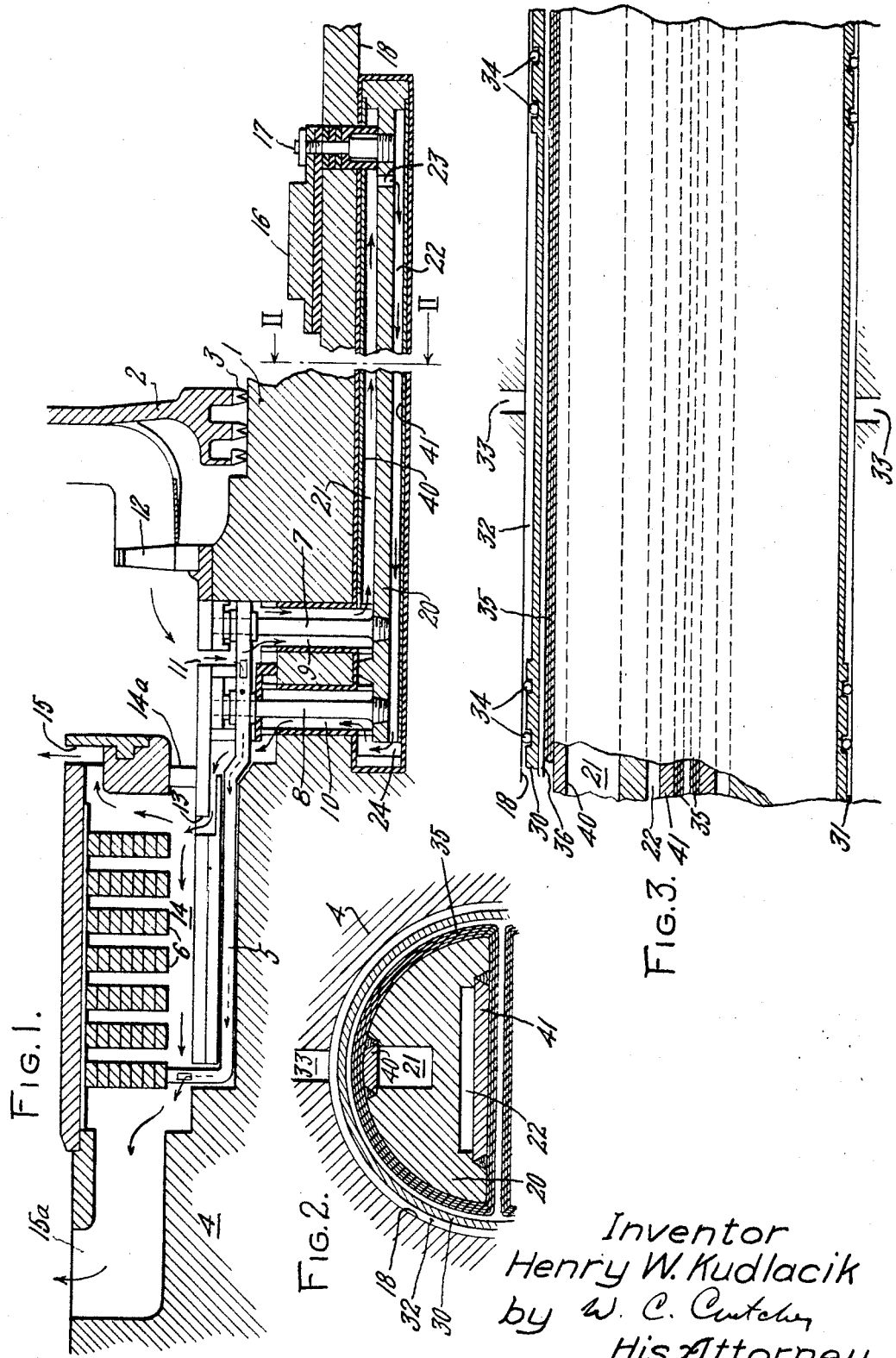

United States Patent Office 3,393,333
Patented July 16, 1968

3,393,333
GENERATOR COOLING STRUCTURE
Henry W. Kudlacik, Scotia, N.Y., assignor to General
Electric Company, a corporation of New York
Filed Oct. 6, 1965, Ser. No. 493,349
7 Claims. (Cl. 310—61)

ABSTRACT OF THE DISCLOSURE

A conductor-cooled dynamoelectric machine connection bar, having an improved gas flow system, is provided in the rotor for cooling the connection bars between the slip rings and the rotor field windings. The connection bars are encased within an insulation and sealed within a tube member in the bore of the shaft. The tube member in turn is sealed within the bore by at least one flexible seal in resilient contact with the tube and the bore, and an amorphous sealing material is provided between the tube and the bore.

This invention relates to a cooling system for conductors in a dynamoelectric machine rotor and more particularly to an improved gas flow system in the rotor of a generator for cooling the connection bars between the slip rings and the rotor field windings.

There is a continuing trend in the power generation industry towards generators of increased capacity. However, because of considerations of strength of rotor materials and of transportation problems, the physical size of these machines cannot be conveniently increased in proportion to their increased ratings. It has thus been necessary to increase the current loading on the generator conductors. This has given rise to an added burden of heat removal from the conductors inside the generator casings. The conductor-cooled generator winding, which is cooled by the passage of coolant fluid such as hydrogen or water, along the conductor or in close proximity thereto, has been a significant development in remedying this problem and permitting larger output generators to be made without increasing the size of their frames.

In the case of the rotor in particular, increased current in its conductors means increased current through the connection bars. Connection bars are the conductors electrically connecting the slip or collector rings, which are outside the generator casing, to the rotor field windings, which are inside. Since the connection bars extend from within to without the generator casing, their cooling by the conductor-cooled method is attended by the problem of keeping the coolant fluid within the generator casing or, at any rate, within a closed system so as not to leak out. Furthermore, for maximum effectiveness, the best possible coolant flow must be obtained and an optimum arrangement of the cross sectional areas of electrical conductor and coolant conduit arrived at.

Patent No. 2,798,977 to Henter shows a prior art method of sealing hydrogen within a generator casing. In this patent, the connection bar 15 is not hydrogen cooled so there is no reason why the gas is needed or should be permitted beyond seal 33.

Patent No. 2,950,403 to Kilner and Tudge discloses a generator structure of the general type herein disclosed for cooling a conductor connecting the collector rings to the field windings, in which coolant fluid is motivated by the pumping action of the spinning rotor. The fluid flows in one direction through passages extending along the rotor shaft and in the return direction through the hollow conductors. Each conductor and each passage requires a separate bore in the rotor shaft, and the coolant fluid cools along only half of its path or circuit.

Accordingly it is an object of this invention to provide an improved cooling arrangement for generator connection bars in which maximum benefit is derived from a given coolant flow.

Another object is to provide a conductor-cooled connection bar with an improved hydrogen sealing arrangement to permit greater hydrogen flow.

Another object is to provide a conductor-cooled connection bar which is relatively simple and economical to manufacture.

These and other objects, advantages and features of this invention will become apparent from the following description when considered in connection with the accompanying drawing.

Briefly stated, this invention comprises a cylindrical bore along the axis of a generator rotor, the bore containing connection bars, the bars insulated from one another and from the rotor bore and completely contained and sealed in the insulation, the insulation sealed in the rotor bore forming a gas tight seal therein, axial passages along the connection bars and radial passages connecting the axial passages, at one of their ends, to the generator casing for the passage of coolant therethrough, the radial passages also containing electrical conductors. The axial passages communicate with each other at their opposite ends to form a closed circuit. Coolant flow is motivated, when the rotor is turning, by its being taken into the rotor from the casing at a point of relatively small radius and discharged into the casing of a point of larger radius, the rotor acting like a centrifugal pump or blower. In an alternative embodiment, coolant is motivated by the generator fan and is exhausted by the return passage to the suction side of the fan.

In the drawing:

FIG. 1 is a longitudinal section of the end of a generator rotor, only the half above the axis being shown.

FIG. 2 is a cross sectional view taken along the line II—II of FIG. 1.

FIG. 3 is an enlarged longitudinal section of a portion of a generator rotor shaft.

Figure 4:
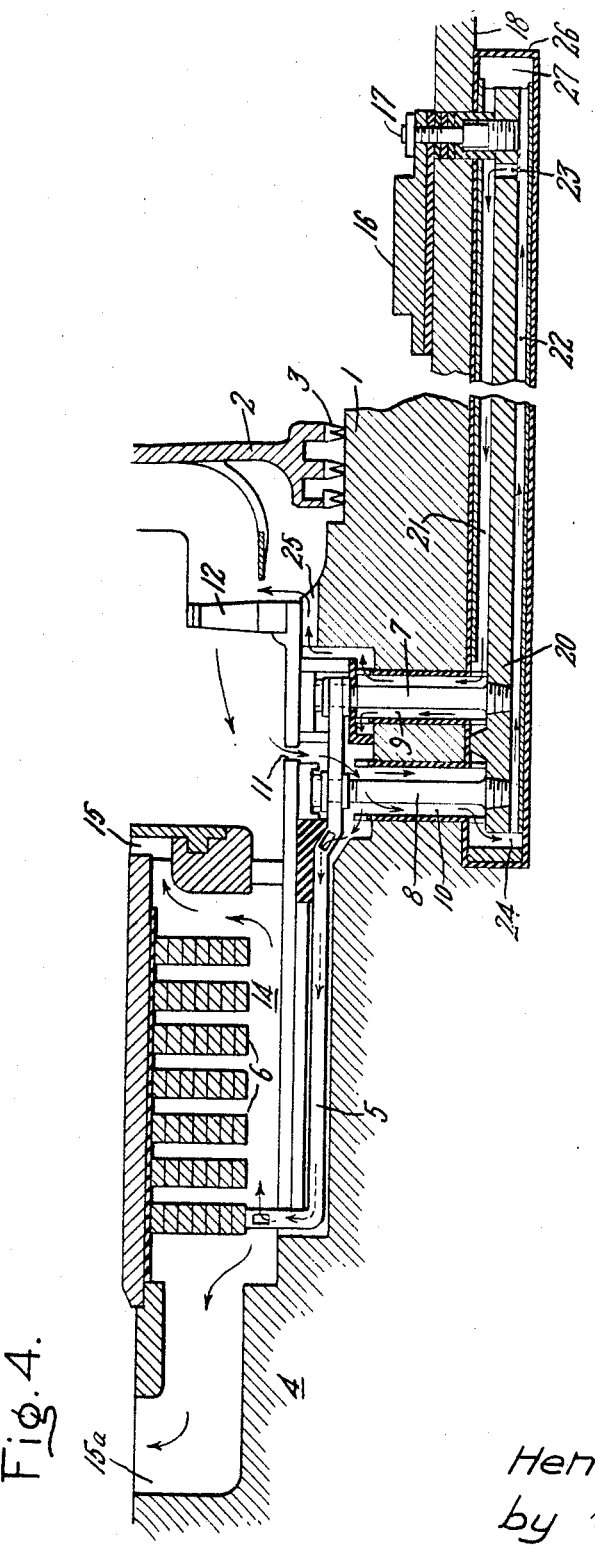
FIG. 4 is a longitudinal section of the end of a generator rotor, similar to FIG. 1, according to a modification of this invention.

Referring now to FIG. 1, a generator rotor shaft portion 1 is shown extending through a substantially gas tight casing 2. Gas is prevented from escaping from casing 2 by means such as a labyrinth seal shown at 3. A slotted rotor core 4 contains axially extending main lead 5 connected at one end to the rotor field end windings 6 and at the other end to radial conductors 7 and 8 (connection not shown). Conductors 7 and 8 extend through radial passages 9 and 10 respectively. Passage 9 communicates at inlet or suction port 11 with the interior of the generator casing in the vicinity of the high pressure side of cooling fan 12, which circulates coolant fluid, generally hydrogen, within the generator casing in the direction of the arrows. Passage 10 communicates by way of port 13 with a chamber 14 beneath the retaining ring holding the end windings 6. Chamber 14 in turn communicates with the interior of the generator casing at outlet or discharge port 15 and/or 15(a) which is at a greater radius than inlet or suction port 11 and is isolated therefrom by a baffle 14a.

Outside of generator casing 2, a source of excitation current (not shown) supplies current to collector rings 16 (only one shown). Collector rings 16 are electrically connected to radial conductors 17 which carry excitation current to main lead 5 via conductors 7 and 8 and axial connection bars which will now be described.

An axial bore 18 is formed along the center of rotor shaft 1 and extends along the rotor shaft beyond radial conductors 7 and 8 as shown.

As shown in FIGURES 2 and 3, bore 18 contains a tube 30 of steel or other suitable metal or insulating material. Between bore 18 and tube 30 is a clearance 31 which is deepened in one area to form a chamber 32 which is made accessible by holes 33 spaced 180° apart in the rotor shaft. Clearance 31 is sealed at both sides of holes 33 as for example by O rings 34.

A suitable epoxy resin or rubber is put into chamber 32 through holes 33 and is cured to form a gas tight seal between bore 18 and tube 30. Seals 34 are placed inboard and outboard at each end of tube 30 to prevent leakage of epoxy outward and leakage of coolant or air inward. O rings 34 are included for the purpose of forming a gas tight seal between bore 18 and tube 30. Either the resin in chamber 33 or the O ring seal is adequate by itself but the preferred embodiment at present includes both O ring and resin seals.

Within tube 30 is contained a pair of conductors or connection bars 20 contained within insulation tape or other suitable insulating material 35. Insulated connection bars 20 are fixed and sealed within tube 30 by a suitable epoxy resin or rubber in the space 36 between insulator 35 and tube 30.

Connection bar 20 is formed with longitudinal cooling passage 21 and longitudinal return passage 22 therein. These passages are covered by strips 40 and 41 welded or brazed thereover. Cooling passage 21 communicates through radial passage 23, with return passage 22. Return passage 22 communicates with radial passage 10 through transverse passage 24. Radial conductors 7 and 8 are pipe threaded into the body of connection bar 20 as shown in FIG. 1.

The operation of the above described structure will now be described. Electrically, excitation current flows from collector ring 16 through radial conductor 17, connection bar 20, radial conductors 7 and 8, and main lead 5 to field end windings 6. Mechanically, as rotor 1 is spinning, a difference in the pressure at the ports 15 and 11 is created due to the differences in the radii at ports 15 and 11. The coolant fluid within the generator casing will thus be motivated to flow from the intake at port 11 to discharge at port 15. The coolant fluid so motivated will pass through port 11, passage 9, longitudinal cooling passage 21, transverse passage 23, back through longitudinal return passage 22, transverse passage 24, passage 10, to port 13, discharge duct 14, and finally discharge port 15.

In FIG. 4, a modification of this invention is shown wherein like numbers designate like elements. In this modification, the essential difference is that the coolant fluid is motivated around its cooling circuit by generator fan 12 instead of by rotor pumping action, and the return portion of the circuit exhausts to the suction side of the fan through a port 25 provided for that purpose. The operation is as follows:

Cooling gas flows from the generator casing through port 11, passage 10, transverse passage 24, to longitudinal passage 22, transverse passage 23 and back through longitudinal passage 21 to passage 9 and discharges at port 25 to the suction side of fan 12.

In both modifications the coolant fluid is contained within the generator casing by the seals surrounding the connection bars as previously described.

It will be apparent that the cooling fluid is in effective cooling contact with electrical conductors through its entire cycle and is thus of improved effectiveness in its cooling function. Furthermore, because a single central bore 18 is required for its accommodation, the unit can be more easily and economically machined and assembled. It will further be appreciated that the sealing arrangement of this invention has effectively replaced the prior art seals, as pointed out, for example, in the Henter patent, and a freer flow of hydrogen is permitted by their absence.

While the presently preferred embodiments of this invention has been herein described, it will occur to others of ordinary skill in the art to make modifications of the same which will remain within the concept and scope of this invention, and will not constitute a departure therefrom. For example, tube 30, though presently preferred, is not an essential feature of this invention. The chamber 27 within end cap 26 could be used in the place of transverse passage 23 to route coolant from passage 21 to passage 22. Other combinations and particulars with this concept are intended, the foregoing being used as illustrative examples only. Accordingly, it is intended that the invention be not limited by the details in which it has been set forth but that it encompass all within the purview of the following claims.

What is claimed is:

1. A dynamoelectric machine comprising a rotor member having a shaft portion, a sealed casing surrounding said rotor member and through which one end of said shaft portion projects, said shaft portion having a central axial cylindrical bore, the part of said shaft portion on the inside of said casing having a plurality of radial passages communicating with said axial bore adjacent the inner extremity thereof, a plurality of connection bars longitudinally disposed within said axial bore from the inner toward the outer extremity thereof, insulation separating said connection bars from each other and from the wall of said axial bore, amorphous sealing material interfused in clearance spaces between connection bars and insulation and between insulation and bore to form a gas tight seal therealong, a plurality of longitudinal passages in said connection bars, one of said longitudinal passages communicating through one of said radial passages with the interior of said casing, another of said longitudinal passages communicating through another of said radial passages with the interior of said casing, said longitudinal passages communicating with each other at their outer extremities.

2. A dynamoelectric machine comprising a rotor member having a shaft portion, a sealed casing surrounding said rotor member and through which one end of said shaft portion projects, said shaft portion having a central axial cylindrical bore, the part of said shaft portion on the inside of said casing having a plurality of radial passages communicating with said axial bore adjacent the inner extremity thereof, said radial passages containing conductors, a pair of connection bars longitudinally disposed within said axial bore from the inner toward the outer extremity thereof, insulation separating said connection bars from each other and from the wall of said axial bore, amorphous sealing material interfused in clearance spaces between connection bars and insulation and between insulation and bore to form a gas tight seal therealong, each connection bar having a longitudinal cooling passage and a longitudinal return passage, said cooling passage communicating through one of said radial passages with the interior of said casing, said return passage communicating through another of said radial passages with the interior of said casing, said cooling and return passages connected adjacent their outer extremities, and means to motivate coolant fluid through the circuit thus formed.

3. A dynamoelectric machine according to claim 2 wherein said radial passages communicate with the interior of said casing at points of different radius.

4. A dynamoelectric machine according to claim 2 wherein said rotor carries a fan and said radial passages communicate with the interior of said casing on opposite sides of said fan.

5. A dynamoelectric machine according to claim 2 wherein said connection bars are encased with said insulation and amorphous sealing material within a tube member which is in turn encased with amorphous sealing material within said bore, said tube member surrounded by at least one flexible seal in resilient contact with said tube member and with said bore.

6. A dynamoelectric machine according to claim 2 wherein said connection bars are encased with said insulation and amorphous sealing material within a tube member which is in turn encased within said bore, said tube member surrounded by at least one flexible seal in resilient contact with said tube member and with said bore.

7. A dynamoelectric machine according to claim 5 wherein said tube member is surrounded by a plurality of said flexible seals, including inboard seals to hold in said amorphous material and outboard seals to hold out generator coolant fluid and air.

References Cited
UNITED STATES PATENTS

| | | | |
|---|---|---|---|
| 2,286,871 | 6/1942 | Mortensen | 310—262 |
| 2,798,977 | 7/1957 | Henter | 310—232 |
| 2,950,403 | 8/1960 | Kilner et al. | 310—61 |
| 3,043,901 | 7/1962 | Gerwing et al. | 310—61 |
| 3,145,314 | 8/1964 | Becker | 310—61 |
| 3,353,043 | 11/1967 | Albright | 310—61 |

MILTON O. HIRSHFIELD, *Primary Examiner.*

R. W. TEMPLETON, *Assistant Examiner.*